United States Patent
Cudahy et al.

[11] Patent Number: 5,810,946
[45] Date of Patent: Sep. 22, 1998

[54] METHOD FOR THE PRODUCTION OF GALVANIZING FLUXES AND FLUX FEEDSTOCKS

[75] Inventors: Michael W. Cudahy, Jackson, Tenn.; Allan S. Myerson, Suffern, N.Y.

[73] Assignee: Metals Recycling Technologies Corp., Atlanta, Ga.

[21] Appl. No.: 795,343

[22] Filed: Feb. 4, 1997

[51] Int. Cl.[6] .................................................. B23K 35/34
[52] U.S. Cl. ........................... 148/26; 423/101; 423/622; 205/305
[58] Field of Search ................ 148/26; 423/101, 423/463, 622; 205/305

[56] References Cited

U.S. PATENT DOCUMENTS

| | | | |
|---|---|---|---|
| 3,321,339 | 5/1967 | Schulze | 148/23 |
| 3,816,188 | 6/1974 | Clay | 148/26 |
| 4,042,731 | 8/1977 | Chay | 427/311 |
| 4,802,932 | 2/1989 | Billiet | 148/23 |
| 4,865,831 | 9/1989 | Murphy et al. | 423/101 |
| 4,911,764 | 3/1990 | Farnsworth | 148/26 |
| 5,208,004 | 5/1993 | Myerson | 423/622 |
| 5,292,377 | 3/1994 | Izeki et al. | 148/23 |
| 5,431,713 | 7/1995 | Myerson et al. | 75/743 |
| 5,437,738 | 8/1995 | Gerenot et al. | 148/26 |
| 5,453,111 | 9/1995 | Myerson et al. | 75/725 |
| 5,464,596 | 11/1995 | Myerson | 423/101 |

FOREIGN PATENT DOCUMENTS

| | | |
|---|---|---|
| 0 227 024 | 7/1987 | European Pat. Off. . |
| 0 084 478 | 12/1987 | European Pat. Off. . |
| 24 52 409 | 5/1975 | Germany . |

*Primary Examiner*—Melvyn Andrews
*Attorney, Agent, or Firm*—Deveau, Colton & Marquis

[57] ABSTRACT

A method for the production of zinc ammonium chloride complex salts for use as galvanizing fluxes by heating waste materials captured from industrial processes containing zinc in a reducing atmosphere, leaching the resultant captured waste materials in an ammonium chloride solution resulting in a first product solution and a first undissolved materials, adding zinc metal to the first product solution resulting in a second product solution and a second undissolved materials, and adding additional ammonium chloride and/or hydrochloric acid to the second product solution resulting in the production of zinc ammonium chloride complex salts for use as galvanizing fluxes.

19 Claims, 1 Drawing Sheet

METHOD FOR THE PRODUCTION OF GALVANIZING FLUXES AND FLUX FEEDSTOCKS

BACKGROUND OF THE INVENTION

1. Field of the Invention

The present invention relates generally to a process for the production of galvanizing fluxes and flux feedstocks, and specifically to a method for the production of zinc ammonium chloride galvanizing fluxes and flux feedstocks from waste materials comprising zinc and/or zinc compounds.

2. Prior Art

Galvanizing is the coating of a ferrous metal by passing it through a bath of molten zinc or by the electrodeposition of zinc onto a ferrous metal. In the former process, the iron and zinc combine to form an intermetallic compound at the interface, the outer surface being relatively pure zinc, which crystallizes as it cools, to form the characteristic spangle. The electrodeposition method gives a uniform surface which may be either dull or bright. The purpose of galvanizing is to provide a quantum of corrosion protection for the ferrous metal. The duration of the corrosion protection is directly related to the thickness of the zinc coating.

Fluxes are substances that are applied to metals that are to be united. On the application of heat, or other energy, fluxes aid the flow of one metal as it melts so as to coat the second metal, and prevents the formation of oxides during the coating process. Galvanizing fluxes are fluxes used in the coating of a ferrous metal by zinc or a zinc alloy.

Various classes of galvanizing fluxes are known in the art. The category of zinc ammonium chlorides is one such class of galvanizing fluxes. Zinc ammonium chlorides are complex salts and are typically classified as double salts. Although the most common zinc ammonium chloride is $ZnCl_2.2NH_4Cl$, double salts with three or six molecules of ammonium chloride, $ZnCl_2.3NH_4Cl$ and $ZnCl_2.6NH_4Cl$, also have been prepared. Zinc ammonium chloride may be in solution or a paste, but is typically is a white powder or crystal, and more specifically a white granular deliquescent crystal or crystalline powder. Zinc ammonium chloride is soluble in water, alcohol, glycerin and ether.

Various zinc ammonium chloride galvanizing fluxes are known in the art. U.S. Pat. No. 4,042,731 discloses a galvanizing flux consisting essentially of a fluxing material selected from zinc ammonium chloride double salt and a mixture of zinc chloride and ammonium chloride and sorbital. U.S. Pat. No. 5,292,377 discloses a flux comprising zinc chloride and/or stanischloride, an alkali metal chloride and/or an alkaline earth metal chloride, and an alkyl quartenary ammonium salt. U.S. Pat. No. 4,911,764 discloses a chloride based galvanizing flux containing zinc chloride, ammonium chloride, and a rare earth chloride. U.S. Pat. No. 4,802,932 discloses a fluoride free flux composition comprising a specific ratio of zinc chloride and ammonium chloride and a wetting agent. U.S. Pat. No. 3,816,188 discloses a low-fuming galvanizing flux containing zinc chloride or zinc bromide and a zinc phosphate or zinc phosphite. U.S. Pat. No. 3,321,339 discloses a galvanizing flux consisting essentially of ammonium chloride, zinc chloride or zinc ammonium chloride, and a sodium salt of an alkyl sulfonate and an oleyl alcohol condensation produce.

Various methods for producing zinc ammonium chloride products also are known in the art. German Patent No. 2,452,409 discloses a method for the production of zinc chloride-ammonium chloride double salts for fluxes from the off-gases from hot dip galvanizing processes or the recycling of wastes from these processes. Zinc chloride-ammonium chloride double salts are produced from waste gases containing one or more of zinc chloride, ammonia and hydrochloric acid by scrubbing the gases with a minimum amount of water, which is recirculated for further enrichment, analyzing the aqueous solution obtained, adding one or more of zinc oxide, hydrochloric acid, zinc chloride or ammonia to obtain the stochiometric composition of the double salt, and optionally crystallizing out the salt by distilling off part of the water from the solution. This method is used for treating waste gases from chemical plants or especially hot dip galvanizing plants to obtain flux solutions or dry flux for hot dip galvanizing.

European Patent No. 227,024 discloses a method for working up dust purifying waste air of hot-galvanizing plants by dispersing the dust in water, old acid or flux, and dissolving zinc compounds with the addition of acid or ammonia. Dust arising from cleaning the exhaust air from a galvanizing plant is formed into a slurry with water, and an oxidizing agent is added to precipitate oxidic Fe(III) compounds. The remaining solution is used as a flux in the galvanizing plant, or commercial chemicals are recovered. Hydrogen peroxide is used as the oxidizing agent or, alternatively, nitric acid.

European Patent No. 84,478 discloses a method for regeneration of a flux bath in a hot dip galvanizing line by continuous flux stream withdrawal for iron removal. An aqueous zinc/ammonium chloride flux bath, used to treat steel parts before hot dip galvanizing, is regenerated by withdrawing a constant stream from the flux bath; adding hydrogen peroxide, in the stochiometric amount for oxidation of iron to the trivalent state, and ammonia to maintain a pH of 4; allowing ferric hydroxide formation under quiescent conditions; and decanting the solution for recycling. The regeneration is effected continuously so that the flux solution only contains small amounts of iron and the consumption of hydrogen peroxide is minimized.

The inventors are unaware of any processes for the production of zinc ammonium chloride galvanizing fluxes utilizing the zinc-comprising waste streams from common chemical production processes or steel or iron production processes as the feed product. Many waste streams from chemical processes and iron-related forming processes comprise zinc compounds, often in the form of zinc oxides. Such waste streams can be treated in a manner so as to form zinc ammonium chlorides suitable for use as galvanizing fluxes. Various methods for treating such zinc and zinc compound containing waste streams to recover chemical values are known in the art. For example, several United States and foreign patents issued to Metals Recycling Technologies Corporation of Atlanta, Ga. disclose and claim basic methods for treating zinc and zinc compound containing waste streams so as to recover chemical and metal values.

U.S. Pat. No. 5,208,004 discloses a method for the recovery of zinc oxide from industrial waste materials comprising zinc by treating the waste material with ammonium chloride resulting in a solution and undissolved components, treating the solution with zinc metal to displace undesired metal ions from the solution, precipitating zinc compounds from the solution, washing the precipitated zinc compounds, and drying the remaining zinc compound resulting in essentially pure zinc oxide.

U.S. Pat. No. 5,431,713 discloses a method for the reclamation of, inter alia, zinc from dust containing zinc by leaching the dust with sulfuric acid or ammonium bisulfate, neutralizing the leachate with zinc oxide or zinc hydroxide, and cementing and/or roasting the products for the reclamation of, inter alia, zinc.

U.S. Pat. No. 5,464,596 discloses a method for the recovery of zinc products, including zinc oxide and elemental zinc, from industrial waste streams containing zinc by treating the waste steams with carbon and an ammonium chloride solution resulting in a solution and undissolved components, using zinc metal to displaced undesired metal ions from the solution, further treating the solution to remove therefrom the zinc compounds, and further treating the zinc compounds as necessary to result in the zinc products.

U.S. Pat. No. 5,453,111 discloses a method for the recovery of metals, including zinc and zinc oxide, from industrial waste streams, which also involves the recovery of lead and cadmium from the waste stream.

The method for producing zinc ammonium chloride galvanizing fluxes from industrial waste streams disclosed herein also can be carried out in various processes for producing enriched iron feedstocks from industrial waste streams, such as those offered by Metals Recycling Technologies Corporation of Atlanta, Ga. Metals Recycling Technologies Corporation has various patents for producing iron feedstocks from industrial waste streams, which industrial waste streams may contain zinc. U.S. Pat. Nos. 5,571,306 and 5,582,631 disclose a method for producing an enriched iron feedstock from industrial furnace waste streams and a method for the production of a feedstock containing usable iron constituents from industrial waste streams, respectively. The preferred waste stream typically contains zinc oxide which is dissolved in an ammonium chloride solution and removed from the iron feedstock production processes. The zinc/ammonium chloride solution, which is an intermediate product, can be used as the initial feed to the method for producing zinc ammonium chloride galvanizing fluxes disclosed herein.

Although various methods for producing zinc ammonium chloride galvanizing fluxes are known in the art, including recycling methods, the inventors are unaware of any process for treating zinc and zinc compound containing industrial waste streams so as to produce such zinc ammonium chloride galvanizing fluxes. Therefore, there is a need for a process which effectively treats zinc and zinc compound containing industrial waste streams, which waste streams typically are hazardous wastes and which are expensive to dispose of, so as to produce economically valuable products, including zinc ammonium chloride galvanizing fluxes. It is to this need that the present invention is directed.

BRIEF SUMMARY OF THE INVENTION

The present invention satisfies this need in a method which produces various zinc ammonium chloride complex salts suitable for use as galvanizing fluxes from waste material streams containing zinc and/or zinc compounds. The solutions used in the process are recycled such that the process minimizes any liquid waste. The process may be combined with or added to any of a number of other processes, including other processes for the recovery of zinc oxides or iron feedstocks so as to be one stage in a multi-stage industrial waste stream recycling process.

The waste material stream, preferably typically material captured from the exhaust fumes from an industrial waste process, for example fly ash or flue dust such as electric arc furnace (EAF) dust, optionally is heated in a reducing atmosphere at temperatures greater than 500° C. for a predetermined time. The heating in a reducing atmosphere causes a decomposition of the franklinite zinc oxide-iron oxide complex into zinc oxide, iron oxide and other components. The fumes from this heating step then are collected and passed through a capture means, such as a bag house or vortex separator for example, and the captured material is considered as the waste material.

The waste material, for example (a) the captured material from the exhaust fumes from the industrial waste streams, (b) the captured material from the fumes from the step of heating the captured material from the exhaust fumes from an industrial waste process, or (c) a combination of the two, is leached with an ammonium chloride solution resulting in a first product solution and first undissolved materials. The first product solution and the first undissolved materials are separated from each other. The first undissolved materials may be further treated to recover valuable components, such as an iron feedstock suitable for introduction to an iron or steel making process.

Zinc metal is added to the first product solution to cement out any lead, cadmium and/or copper contained in the first product solution. The remaining second product solution and any remaining undissolved materials, including any precipitated compounds (together referred to as the second undissolved materials), are separated from each other. The second undissolved materials may be further treated to recover other valuable components.

The remaining second product solution, which comprises dissolved $(NH_3)_2 ZnCl_2$, then is further treated to produce the zinc ammonium chloride complex salts, also in solution, as well as other zinc compounds. The preferred zinc ammonium chloride complex salts are $3NH_4Cl.ZnCl_2$ and $2NH_4Cl.ZnCl_2$. $3NH_4Cl.ZnCl_2$ is approximately 54.1% ammonium chloride and approximately 45.9% zinc chloride and is produced from the following reaction:

$2NH_4Cl.ZnCl_2$ is approximately 44.0% ammonium chloride and approximately 56.0% zinc chloride and is produced as follows:

Therefore, it is an object of the present invention to provide a method for producing zinc ammonium chloride galvanizing fluxes from waste materials, such as fly ash or flue dust.

It is another object of the present invention to provide a method for producing zinc ammonium chloride galvanizing fluxes from waste materials which may contain other metals, such as iron oxide, lead oxide, cadmium and other materials, as part of an overall process for recovering chemical and metal values from waste materials.

Yet another object of the present invention is to provide a method for producing zinc ammonium chloride galvanizing fluxes in which all waste solutions used and produced in the process are recycled for further use.

These objects and other objects, features and advantages of the present invention will become apparent to one skilled in the art when the following detailed description of a preferred embodiment is read in conjunction with the appended figure.

DETAILED DESCRIPTION OF A PREFERRED EMBODIMENT

Figure 1:
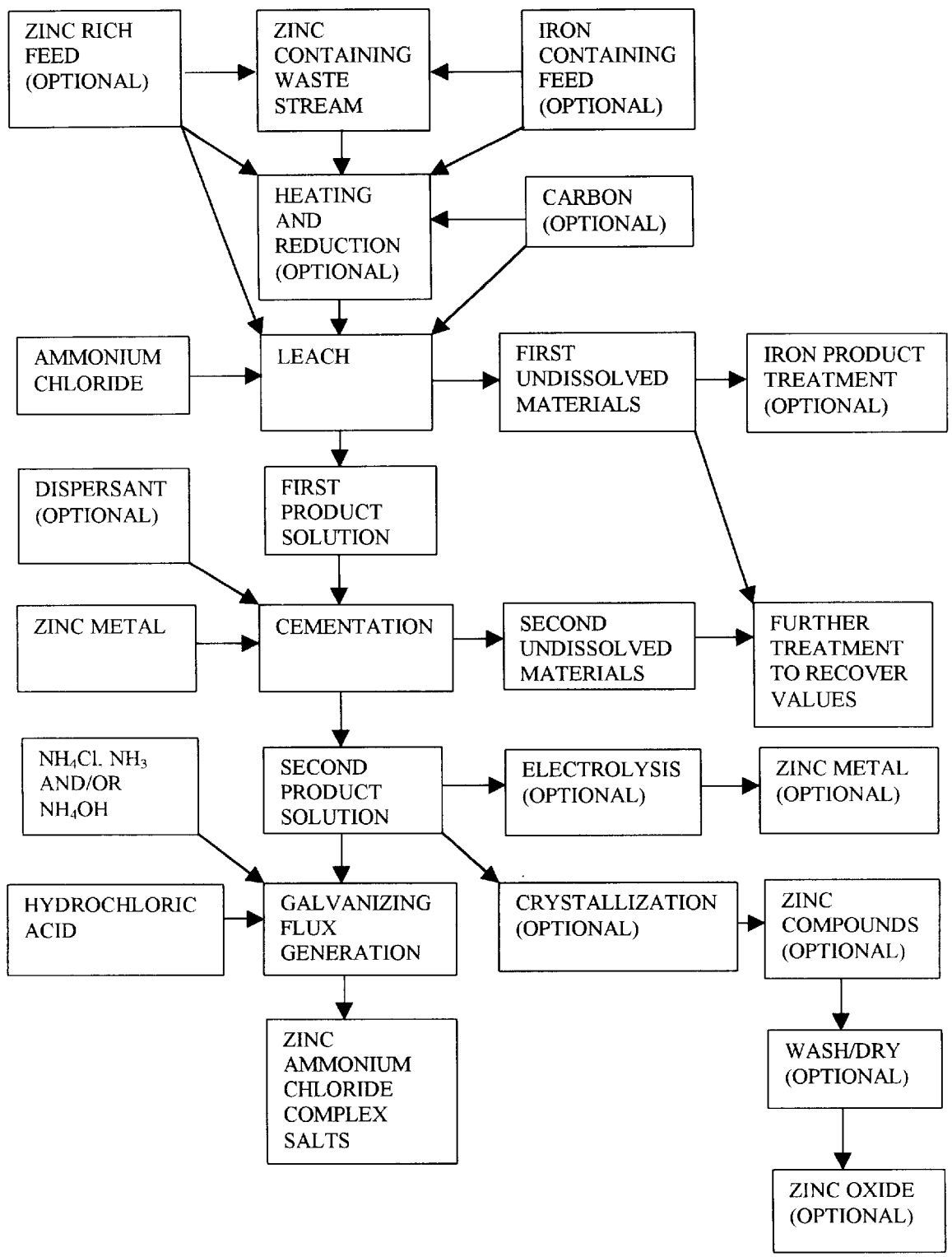
FIG. 1 is a process flow diagram of a representative process of the present invention.

The method for producing zinc ammonium chloride galvanizing fluxes disclosed herein preferably is carried out in its best mode by producing these fluxes from the zinc-comprising waste streams of industrial or other processes. For example, suitable waste streams include EAF dust, fumes from the rotary hearth treatment of EAF dust, galvanizing residues and ashes, and any other zinc comprising waste material also comprising chlorides. A typical suitable industrial waste stream is a flue gas where the charge contains galvanized steel, having the following approximate percent composition:

TABLE 1

| Component | Weight Percent |
| --- | --- |
| Zinc Oxide | 37–42 |
| Iron Oxide | 34–39 |
| Lead Oxide | 3–8 |
| Calcium Oxide | 1–4 |
| Potassium Oxide | 1–4 |
| Manganese Oxide | Less than 3 |
| Tin Oxide | Less than 3 |
| Aluminum Oxide | Less than 2 |
| Magnesium Oxide | Less than 2 |
| Chromium Oxide | Less than 2 |
| Copper Oxide | Less than 1 |
| Silver | Less than 1 |
| Inert and Unidentified Materials | Less than 12 |

The waste material stream, as exemplified in Table 1, contains mostly zinc oxide and iron oxide compounds, along with other compounds. The other compounds may be further treated in order to recover chemical and metal values. The inert and unidentified materials typically include siliceous material, such as slag (with carbon granules occluded), molybdenum, antimony, indium, cadmium, germanium, bismith, titanium, nickel and/or boron. Other materials also may be included, depending upon the particular waste stream used.

The waste stream typically is a fume or exhaust from the industrial process. The fume is passed through a baghouse or other capture means. The captured materials then are subjected to the process described herein to produce the galvanizing fluxes. The term waste stream is used to denote the exhaust from an industrial process. The term waste material stream or waste materials is used to denote the process feed, which are the materials captured from the waste stream, whether or not first heated in a reducing atmosphere.

Generally, the present method for producing zinc ammonium chloride galvanizing fluxes from waste material streams which comprise zinc compounds, comprises the steps of:

a. treating the waste material stream with an ammonium chloride solution at an elevated temperature to form a first product solution, which comprises dissolved zinc and dissolved zinc oxide, and first undissolved materials;

b. adding zinc metal to the first product solution to form a second product solution, which comprises dissolved zinc and dissolved zinc oxide, and second undissolved materials; and c. adding hydrochloric acid and $NH_3$, $NH_4OH$ and/or $NH_4Cl$ to the second product solution resulting in the formation of zinc ammonium chloride salts.

To this basic general process, additional steps may be added to increase the yield and purity of the zinc ammonium chloride salts. A heating step may be added in which the waste material stream is heated at an elevated temperature in a reducing atmosphere. Often, the waste materials comprise franklinite which, when heated to temperatures greater than 500° C., will decompose into zinc oxide and other components. The zinc oxide reacted from the franklinite then is leached in the ammonium chloride solution along with the zinc oxide already contained in the waste materials. The fumes from this heating step are collected and passed through a baghouse or other capture means. The captured materials constitute the waste materials or waste material stream.

Once the waste materials are treated with the ammonium chloride solution, resulting in the first product solution and the first undissolved materials, the first product solution and the first undissolved materials may be separated from each other. This allows the first product solution to be treated outside of the presence of a significant quantity of the first undissolved materials, thus eliminating the chance that some of the first undissolved materials may carry forward through the zinc ammonium chloride production process. Likewise, the first undissolved materials can be further treated outside of the presence of the first product solution resulting in the recovery of other chemical and metal values outside of the presence of a significant quantity of the first product solution.

Similarly, after the zinc metal has been added to the first product solution resulting in the formation of the second product solution and the second undissolved materials, the second product solution and the second undissolved materials may be separated from each other. This allows the second product solution to be treated outside of the presence of a significant quantity of the second undissolved materials, thus eliminating the chance that some of the second undissolved materials may carry forward through the zinc ammonium chloride production process. Likewise, the second undissolved materials can be further treated outside of the presence of the second product solution resulting in the recovery of other chemical and metal values outside of the presence of a significant quantity of the second product solution.

Along with the addition of the zinc metal to the first production solution, a dispersant may be added to prevent aggregation of the zinc metal. Zinc metal powder typically aggregates to form large clumps which then sink to the bottom of the vessel. The use of a dispersant allows the zinc metal powder to remain suspended, increasing the efficiency of this cementation step.

1. General Process

A. Heating in a Reducing Atmosphere.

The step of heating the waste material stream in a reducing atmosphere can be carried out prior to the leaching step, or between a first and second leaching step. In the heating step, the waste material stream is heated to a temperature greater than 500° C. This temperature causes, inter alia, a reaction which causes decomposition of any stable franklinite phase into zinc oxide, iron ozide and other components, yet does not allow for the complete reduction of zinc oxide to zinc metal.

The waste materials can be heated using any convention roasting process, such as, for example, direct or indirect heating and the passing of hot gases through the dust. Non-explosive mixtures of reducing gases, such as for example hydrogen gas and nitrogen or carbon dioxide, can be passed through the waste materials. Carbon or simple carbon containing species, including carbon containing reducing gases and elemental carbon, also may be used as the reducing gas. The use of a reducing gas allows the conversion of any iron oxides present into direct reduced iron, which can be recovered later as disclosed in various other patents issued to Metals Recycling Technologies Corporation.

The fumes from this heating step are collected and passed through a capture means, such as for example a baghouse. The captured materials constitute the waste material stream, or waste materials.

B. Leaching

The waste material stream, which is the captured materials from the fumes or exhaust of the industrial process exhaust or the captured materials from the fumes or exhaust of the step of heating the waste materials in a reducing atmosphere, then is leached in an ammonium chloride solution in water, prepared in known quantities and concentrations. The zinc oxide dissolves in the ammonium chloride solution along with other metal oxides, such as lead oxide and cadmium oxide. Any iron oxide in the waste material will not dissolve in the ammonium chloride solution.

A 23% by weight ammonium chloride solution in water at a temperature of at least 90° C. provides the best solubility of zinc oxide. Generally, concentrations of ammonium chloride below about 23% do not dissolve the maximum amount of zinc oxide from the waste stream, and concentrations of ammonium chloride above about 23% tend to precipitate zinc complexes and diammonium zinc dichloride out along with the zinc oxide when the solution is cooled. However, 18–23% has been found to be the preferred concentration range.

The zinc oxide, as well as smaller concentrations of lead, copper and/or cadmium oxide if present, are removed from the waste material stream by dissolution in the ammonium chloride solution as a first product solution. The solid remaining after this leaching step contains zinc, iron, lead and/or cadmium, and possibly some other impurities, as well as the above-mentioned insolubles, depending on the composition of the waste stream. This solid is referred to as the first undissolved materials. The first undissolved materials preferably then are separated from the first product solution.

C. Cementation

Zinc metal is added to the first product solution in a cementation step. Either finely powdered zinc metal or other metallic zinc wastes may be used for cementation. Preferably, the first product solution is maintained at a temperature of 90° C. or above while the zinc metal is added. Through an electrochemical reaction, any lead metal in the first product solution plates out onto the surfaces of the zinc metal particles. The addition of sufficient powdered zinc metal results in the removal of virtually all of the lead from the first product solution. The solution remaining after this cementation step is referred to as the second product solution. Any solids added or generated (precipitated) during the cementation step are referred to as the second undissolved materials. The second undissolved materials preferably then are separated from the second product solution.

Finely powdered zinc metal, when added to a solution, typically aggregates to form large clumps which sink to the bottom. There are two preferred methods to prevent this aggregation. The first is to use mixing with high shear forces. The second is to use any one of a number of water soluble polymers which act as antiflocculants or dispersants may be used to prevent such aggregation by adding the polymer(s) to the first product solution with the zinc metal.

Alternatively, a number of surface active materials also will act to keep the finely powdered zinc metal suspended, as also will many compounds used in scale control. These materials only need be present in concentrations of 10–1000 ppm. Various suitable materials include water soluble polymer dispersants, scale controllers, and surfactants, such as lignosulfanates, polyphosphates, polyacrylates, polymethacrylates, malaeic anhydride copolymers, polymalaeic anhydrides, phosphate esters, and phosphonates. These and other dispersants are known in the art and various other dispersants may be used without undue experimentation by one skilled in the art.

The cementation step preferably is carried out by adding approximately 1.4 to 2 times the stochiometric amount of zinc and dispersant. After this initial striking step, any lead, cadmium and/or copper concentration remaining in the second product solution in monitored. A second polishing step then may be performed by adding a small amount of finely powdered zinc metal and dispersant as necessary.

D. Complex Salt Production

The second product solution then is further treated to produce the zinc ammonium chloride complex salts used as galvanizing fluxes. The second product solution already comprises $(NH_3)_2ZnCl_2$ and $NH_4Cl$. The addition at this stage of hydrochloric acid tends to cause the formation of $2NH_4Cl.ZnCl_2$ according to the following reaction:

Adding additional ammonium chloride (or ammonia) at this stage tends to push the reaction to produce $3NH_4Cl.ZnCl_2$ according to either of the following reactions:

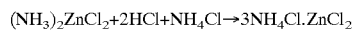

The zinc ammonium chloride complex salts formed according to this process tend to have the weight percent compositions shown in Table 3.

TABLE 3

| Salt | Weight % Ammonium Chloride | Weight % Zinc Chloride |
|---|---|---|
| $2NH_4Cl.ZnCl_2$ | 44.0 | 56.0 |
| $3NH_4.ZnCl_2$ | 54.1 | 45.9 |

The zinc ammonium chloride complex salts are in aqueous form at this stage. The salts may be used in this form as the galvanizing fluxes. Alternatively, some of the water may be evaporated to produce a more concentrated flux and/or a more viscous flux. Also alternatively, the diamino zinc dichloride may be crystallized out of solution by cooling, as disclosed in more detail below, to produce a flux product or a feedstock for producing the flux product.

E. Zinc Rich Secondary Feed

To increase the amount of zinc ammonium chloride complex salts produced, an optional secondary zinc rich feed may be incorporated. This secondary zinc rich feed may be added to the waste stream prior to the step of heating in a reducing atmosphere or prior to the leaching step. Alternatively, the secondary zinc rich feed may be added directly to the step of heating in a reducing atmosphere or the leaching step.

This basic process for producing zinc ammonium chloride galvanizing fluxes is shown in the two left-hand columns of FIG. 1. From the above detailed description of a preferred embodiment and FIG. 1, one skilled in the art will be able to understand this invention.

2. Optional Side Processes

A. Addition of Iron Containing Feed

Secondary feeds containing iron can be added to the waste stream or to the step of heating in a reducing atmosphere. The addition of an iron containing feed to the process will increase the amount of direct reduced iron (DRI) produced in the step of heating in a reducing atmosphere, if DRI is made as an option. This also may increase the amount of iron compounds in the first undissolved materials. The first undissolved materials, if they still contain iron compounds, may be further treated to produce additional DRI, iron products and/or an enriched iron feedstock which can be used in the production of steel or iron. An increase in the amount of iron compounds in the first undissolved materials will result in an increase in the amount and/or quality of any enriched iron product resulting from a further treatment of the first undissolved materials.

B. Carbon Addition Step

Carbon may be added to the step of heating in a reducing atmosphere, the leach step, or to the first undissolved materials. Since the carbon is not soluble in the ammonium chloride solution and will not react in an aqueous solution, the carbon, whether added to the step of heating in a reducing atmosphere or the leach step, will remain as part of the first undissolved materials. Combining carbon and iron oxide results in the reduction of iron oxide, producing direct-reduced iron (DRI). DRI can be used to replace all of the steel scrap charged to a steel mill. Preferably, elemental carbon is added. Different size carbon, such as dust, granules or pellets, may be used depending on the desires of the steel makers.

C. Further Treatment of First Undissolved Materials

The remainder of the first undissolved materials may be further treated using various processes to recover values. The values recovered are dependent upon the composition of the waste stream, whether alone or in combination with a zinc rich and/or iron containing feed. Therefore, a variety of further treatments may be used. One skilled in the art would be able to determine, without undue experimentation, these further treatments when provided with the composition of the feed to the leaching step.

D. Further Treatment of Second Undissolved Materials

The remainder of the second undissolved materials may be further treated using various processes to recover values. The values recovered are dependent upon the composition of the waste stream, whether alone or in combination with a zinc rich and/or iron containing feed. Therefore, a variety of further treatments may be used. One skilled in the art would be able to determine, without undue experimentation, these further treatments when provided with the composition of the feed to the leaching step. Such processes are disclosed in U.S. Pat. No. 5,431,713 which in incorporated herein by this reference.

E. Electrolysis Step for Zinc Recovery

The second product solution comprises zinc ions in solution as $Zn^{2+}$. If a part or all of the second product solution is subjected to electrolysis in an electrolytic cell containing an anode and a cathode, the zinc metal is electrodeposited on the cathode. Although it is preferable to have a cathode made from zinc metal, cathodes of other materials also will allow the electrodeposition of zinc metal from the second product solution. Any of the electrolysis cells discussed in the literature and known by those skilled in the art are suitable, as long as such cells are configured for the electrolysis of zinc ion containing solutions.

F. Crystallization Step for Zinc Oxide Recovery

The second product solution is rich in zinc compounds. A part or all of the second product solution may be cooled resulting in the crystallization and recovery of zinc oxide. To recover zinc oxide, the second product solution is cooled to a temperature of between about 20° C. and 60° C. resulting in the crystallization of a mixture of zinc compounds. The mixture contains a significant amount of diamino zinc dichloride, or other complex compounds which involve zinc amino complexes, hydrated zinc oxides and hydroxide species. Crystallization helps to achieve a high purity zinc oxide, typically through control of the temperature-time cooling profile. Reverse natural cooling is preferred to control the nucleation to crystal growth ratio and, ultimately, the crystal size distribution can be controlled.

At this stage, the precipitated crystallized solid, which comprises diamino zinc dichloride $(NH_3)_2ZnCl_2$, is filtered out. The diamino zinc dichloride may be introduced to the galvanizing flux generation step. The diamino zinc dichloride will dissolve in the ammonium chloride-hydrochloric acid solution according to the formulas given above in Section 1.D., and the zinc ammonium chloride complex salts will form.

Alternatively, the crystallized solid is filtered from the cooled second product solution and washed with water at a temperature of between 25° C. and 100° C. The preferred wash water to crystallized solid ratio is between about 5:1 and 20:1, with 10:1 being most preferred. The diamino zinc dichloride dissolves in water while very little of the hydrated zinc oxide dissolves in water. This resultant solution then is filtered to remove the hydrated zinc oxide species, which are then placed in a drying over at a temperature of over 100° C. After a sufficient drying period, typically between 2 to 60 minutes, the resultant dry white powder is essentially pure zinc oxide.

G. Further Treatment of Second Undissolved Materials To Recover Lead and Cadmium If the waste material stream comprises lead and cadmium constituents, these constituents will be found in the second undissolved materials. The second undissolved materials can be treated with sulfuric acid which dissolves zinc and cadmium which may be present in the second undissolved materials. Lead metal is not soluble in sulfuric acid and, thus, any lead present in the second undissolved materials will remain in solid form.

The addition of sulfuric acid will form a slurry comprising metallic and sulfate ions along with insoluble lead sulfate. The slurry is filtered resulting in a solid and a filtrate solution. The solid is mainly lead metal with some impurities depending on the composition of the waste stream. Cadmium present in the filtrate solution may be removed electrochemically by placing a sheet of zinc metal into the solution to produce a cadmium sponge. Alternatively, electrolysis may be used to recover cadmium.

H. Periodic Precipitation of Other Solubles From the Second Product Solution The second product solution also may contain sodium, potassium, magnesium, calcium, manganese, and other solubles in solution depending upon the composition of the waste stream. These solubles can be recovered by introducing an electrolyte into the ammonium chloride solution. As ammonium chloride is used as the leachant, ammonium salts in solution are the preferred electrolyte. For example, if some ammonium sulfate is added, one could precipitate out calcium sulfate. The preferred electrolytes include ammonium sulfate, ammonium hydroxide, or ammonium carbonate. Manganese, if present, can be removed by the addition of an oxidizing agent such as potassium permanganate or hydrogen peroxide, or by forced air or ozone addition.

I. Multiple Leaching and Heating Steps

The waste steam may be subjected to multiple heating in a reducing atmosphere and leaching steps either to purify the first product solution or to increase the concentration of zinc compounds or other compounds in the product solutions and/or the undissolved materials. The most preferred method is the heating-leaching method disclosed above. Alternatively, the step of heating in a reducing atmosphere may be left out. Two other preferred alternatives include leaching-heating-leaching and heating-leaching-heating-leaching.

The above-detailed description of a preferred embodiment sets forth the best mode of the invention as known to the inventors at this time. It will be obvious to one skilled in the art to make modifications to this process without departing from the spirit and scope of the invention and its equivalents as set forth in the appended claims.

What is claimed is:

1. A method for the production of zinc ammonium chloride galvanizing fluxes from waste materials comprising zinc compounds, comprising the steps of:
   a. treating the waste materials with an ammonium chloride solution to form a first product solution which comprises $(NH_3)_2ZnCl_2$, and a first undissolved materials;
   b. adding zinc metal to the first product solution to form a second product solution which comprises $(NH_3)_2ZnCl_2$, and a second undissolved materials; and
   c. adding hydrochloric acid and one or more compounds selected from the group consisting of $NH_4Cl$, $NH_3$ or $NH_4OH$ to the second product solution resulting in the formation of zinc ammonium chloride complex salts for use as zinc ammonium chloride galvanizing fluxes.

2. The method as described in claim 1, wherein said waste materials are treated with an ammonium chloride solution at an elevated temperature of at least 90° C.

3. The method as described in claim 2, wherein the concentration of the ammonium chloride solution is between about 18% and 23% by weight.

4. The method as described in claim 1, further comprising the step of separating the first product solution from the first undissolved materials prior to the addition of zinc metal.

5. The method as described in claim 4, further comprising the step of separating the second product solution from the second undissolved materials prior to the addition of hydrochloric acid.

6. The method as described in claim 1, wherein the zinc metal is in powdered form.

7. The method as described in claim 6, further comprising the step of adding a dispersant to the first product solution concurrently while adding the zinc metal to the first product solution.

8. The method as described in claim 1, further comprising the step of heating the waste materials at an elevated temperature prior to treating the waste materials with the ammonium chloride solution.

9. The method as described in claim 8, wherein the heating step occurs in a reducing atmosphere.

10. The method as described in claim 9, wherein the heating step occurs at a temperature of at least 500° C.

11. The method as described in claim 10, wherein fumes are generated during the step of heating the waste stream, which fumes contain materials which are captured, which captured materials now constitute the waste materials.

12. The method as described in claim 1, further comprising the step of adding additional ammonium chloride to the second product solution.

13. The method as described in claim 1, further comprising the step of adding a secondary zinc rich feed to the waste stream.

14. The method as described in claim 1, further comprising the step of adding a secondary iron containing feed to the waste materials.

15. The method as described in claim 14, further comprising the step of adding carbon to the waste materials.

16. The method as described in claim 1, further comprising the step of further treating the first undissolved materials to recover values.

17. The method as described in claim 1, further comprising the step of further treating the second undissolved materials to recover values.

18. The method as described in claim 1, further comprising the step of subjecting at least a portion of the second product solution to electrolysis to recover zinc metal.

19. The method as described in claim 1, further comprising the step of subjecting at least a portion of the second product solution to crystallization to recover zinc oxide.

* * * * *